United States Patent
Kim et al.

(10) Patent No.: US 10,474,930 B1
(45) Date of Patent: Nov. 12, 2019

(54) LEARNING METHOD AND TESTING METHOD FOR MONITORING BLIND SPOT OF VEHICLE, AND LEARNING DEVICE AND TESTING DEVICE USING THE SAME

(71) Applicant: StradVision, Inc., Gyeongbuk (KR)

(72) Inventors: Kye-Hyeon Kim, Seoul (KR);
Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/152,699

(22) Filed: Oct. 5, 2018

(51) Int. Cl.
*G06K 9/00* (2006.01)
*G06K 9/62* (2006.01)
(Continued)

(52) U.S. Cl.
CPC ....... *G06K 9/6262* (2013.01); *G06K 9/00791* (2013.01); *G06K 9/4671* (2013.01); *G06N 3/04* (2013.01); *G06N 3/084* (2013.01)

(58) Field of Classification Search
CPC ...... G08G 1/167; G06K 9/00805; G06K 9/34; G06K 9/66; G06K 9/6256; G06K 9/4604;
(Continued)

(56) References Cited

U.S. PATENT DOCUMENTS

| 6,911,642 | B2 * | 6/2005 | Sartori | G06T 7/20 |
| | | | | 250/208.2 |
| 8,346,480 | B2 * | 1/2013 | Trepagnier | B60W 30/00 |
| | | | | 180/167 |

(Continued)

*Primary Examiner* — Amir Alavi
(74) *Attorney, Agent, or Firm* — Husch Blackwell, LLP

(57) ABSTRACT

A learning method of a CNN (Convolutional Neural Network) for monitoring one or more blind spots of a monitoring vehicle is provided. The learning method includes steps of: a learning device instructing a detector to output class information and location information on a monitored vehicle in a training image; instructing a cue information extracting layer to output cue information on the monitored vehicle by using the outputted information, and instructing an FC layer to determine whether the monitored vehicle is located on the blind spots by neural-network operations with the cue information or its processed values; and learning parameters of the FC layer and parameters of the detector, by backpropagating loss values for the blind spots by referring to the determination and its corresponding GT and backpropagating loss values for the vehicle detection by referring to the class information and the location information and their corresponding GT, respectively.

24 Claims, 12 Drawing Sheets

(51) Int. Cl.
*G06N 3/04* (2006.01)
*G06N 3/08* (2006.01)
*G06K 9/46* (2006.01)

(58) Field of Classification Search
CPC ........... G06K 9/00288; G06K 9/00791; G06K 9/2054; G06K 9/481; G06K 9/6267; G06K 9/78; G06K 9/6262; G06N 3/08; G06N 3/02
See application file for complete search history.

(56) References Cited

U.S. PATENT DOCUMENTS

| | | | |
|---|---|---|---|
| 9,805,274 B2* | 10/2017 | Ayvaci | G06T 7/13 |
| 9,873,196 B2* | 1/2018 | Szatmary | B25J 5/00 |
| 9,934,440 B1* | 4/2018 | Kim | G06K 9/00791 |
| 9,947,228 B1* | 4/2018 | Kim | G08G 1/167 |
| 10,099,614 B2* | 10/2018 | Diessner | H04N 7/18 |
| 10,106,153 B1* | 10/2018 | Xiao | G06K 9/00805 |
| 2011/0106370 A1* | 5/2011 | Duddle | G06Q 40/08 |
| | | | 701/31.4 |
| 2015/0258990 A1* | 9/2015 | Stettner | G01S 17/023 |
| | | | 701/37 |
| 2017/0103340 A1* | 4/2017 | Zoldi | G06N 7/005 |
| 2017/0355263 A1* | 12/2017 | Banvait | G08G 1/166 |
| 2017/0357859 A1* | 12/2017 | Jain | B60Q 9/008 |

\* cited by examiner

LEARNING METHOD AND TESTING METHOD FOR MONITORING BLIND SPOT OF VEHICLE, AND LEARNING DEVICE AND TESTING DEVICE USING THE SAME

FIELD OF THE INVENTION

The present invention relates to a learning method and a testing method for monitoring one or more blind spots of one or more vehicles, and a learning device and a testing device using the same; and more particularly, to the learning method of a CNN (Convolutional Neural Network) for monitoring one or more blind spots of a monitoring vehicle, including steps of: (a) a learning device, if a training image corresponding to at least one video image taken from the monitoring vehicle is inputted, instructing a detector on the monitoring vehicle to output class information and location information on a monitored vehicle included in the training image; (b) the learning device instructing a cue information extracting layer to perform one or more operations by using the class information and the location information on the monitored vehicle, to thereby output one or more pieces of cue information on the monitored vehicle, and instructing an FC layer for monitoring the blind spots to perform one or more neural network operations by using said pieces of cue information or their processed values on the monitored vehicle, to thereby output a result of determining whether the monitored vehicle is located on one of the blind spots of the monitoring vehicle; and (c) the learning device instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection, and the testing method, the learning device, and the testing device using the same.

BACKGROUND OF THE INVENTION

A monitoring vehicle has a side view mirror for each side thereof and a rear-view mirror at the front center of its cabin for a good field of view of the side and the rear needed for change of lanes by a driver.

Although the side view mirror is used for seeing each side and the rear thereof, it has a blind spot (BS) where the driver cannot see a monitored vehicle or any other objects that are very close thereto.

This has been a problem because there can be an accident with the monitored vehicle in the blind spot if the driver changes lanes without seeing the monitored vehicle.

To prevent such a problem, the driver sometimes put a convex mirror onto a corner of the side view mirror, which enables the driver to see the blind spot.

However, even when the convex mirror is added onto the side view mirror, the driver must see the blind spot with his/her own eyes to change lanes which puts further strain to the driver, and there may exist the blind spot that still cannot be seen through the convex mirror even if the driver alters his/her head position.

To prevent this, a conventional blind spot monitoring system was suggested that aims to prevent accidents from happening when the driver changes lanes without noticing the monitored vehicle in the blind spot, by providing the driver with information on a detection of the monitored vehicle, that is located in the blind spot or approaching the blind spot, through a sensor placed at the rear of the monitoring vehicle.

Especially, the conventional blind spot monitoring system using a vision sensor may detect monitored vehicles included in video information and determine whether the monitored vehicles are on the blind spots by using information on the detected monitored vehicles.

In detail, the conventional blind spot monitoring system using the vision sensor may need some logic to determine whether the monitored vehicles are located on the blind spots by using output signals from a detector which detects the monitored vehicles in the video information.

However, the conventional blind spot monitoring system using the vision sensor may have a problem that an appropriate logic capable of determining whether the monitored vehicles are on the blind spots has to be designed depending on the detector to be used.

In addition, the conventional blind spot monitoring system may have another problem of requiring lots of time to develop because the appropriate logic capable of determining whether the monitored vehicles are on the blind spots has to be designed depending on output characteristics of the designed detector.

SUMMARY OF THE INVENTION

It is an object of the present invention to solve all the aforementioned problems.

It is another object of the present invention to provide a blind spot monitoring system regardless of a type of a detector which detects a vehicle.

It is still another object of the present invention to determine whether the vehicle is located on blind spots by using an output signals from the detector, regardless of the type of the detector.

It is still yet another object of the present invention to provide the blind spot monitoring system capable of allowing the detector to be replaced if necessary.

It is still yet another object of the present invention to minimize time required to develop the blind spot monitoring system.

In accordance with one aspect of the present invention, there is provided a learning method of a CNN (Convolutional Neural Network) for monitoring one or more blind spots of a monitoring vehicle, including steps of: (a) a learning device, if a training image corresponding to at least one video image taken from the monitoring vehicle is inputted, instructing a detector on the monitoring vehicle to output class information and location information on a monitored vehicle included in the training image; (b) the learning device instructing a cue information extracting layer to perform one or more operations by using the class information and the location information on the monitored vehicle, to thereby output one or more pieces of cue information on the monitored vehicle, and instructing an FC layer for monitoring the blind spots to perform one or more neural network operations by using said pieces of cue information or their processed values on the monitored vehicle, to thereby output a result of determining whether the monitored vehicle is located on one of the blind spots of the monitoring vehicle; and (c) the learning device instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection.

As one example, the detector is a vehicle detector based on an R-CNN (Region-based Convolutional Neural Network) including: one or more convolutional layers which generate a feature map from the training image, an RPN (Region Proposal Network) which generates an ROI (Region Of Interest) of the monitored vehicle from the feature map, a pooling layer which generates a feature vector by pooling an area, in the feature map, corresponding to the ROI, at least one FC layer for the vehicle detection which performs at least one fully connected operation on the feature vector, to thereby generate one or more FC output values, a classification layer which outputs the class information on the monitored vehicle by referring to the FC output values, and a regression layer which outputs the location information on the monitored vehicle by referring to the FC output values.

As one example, the loss values for the vehicle detection include one or more class loss values and one or more location loss values of the monitored vehicle, wherein the learning device learns one or more parameters of the FC layer for the vehicle detection and one or more parameters of the convolutional layers by backpropagating the class loss values and the location loss values.

As one example, the learning device instructs the CNN to receive a concatenated value acquired by using said pieces of cue information on the monitored vehicle generated by the cue information extracting layer and the feature vector generated by the pooling layer of the detector, as an input to the FC layer for monitoring the blind spots.

As one example, the FC layer for monitoring the blind spots includes a neural network capable of outputting a result value of whether the monitored vehicle is located on one of the blind spots by a multilayer perceptron to which said pieces of cue information on the monitored vehicle are inputted.

As one example, said pieces of cue information on the monitored vehicle include at least part of (i) the class information on the monitored vehicle, (ii) the location information on the monitored vehicle, (iii) size information on the monitored vehicle corresponding to an ROI (Region Of Interest) size, (iv) aspect ratio information on the monitored vehicle, and (v) distance information between a center of the monitored vehicle and one of outer sides of the blind spots.

As one example, the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information between the center of the monitored vehicle and said one of the outer sides of the blind spots, and further outputs relative location information in addition to the distance information in order to determine whether the center of the monitored vehicle is located inside or outside of said one of the outer sides of the blind spots.

In accordance with another aspect of the present invention, there is provided a testing method of a CNN (Convolutional Neural Network) for monitoring one or more blind spots of a monitoring vehicle, including steps of: (a) on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, a testing device instructing a detector on the monitoring vehicle to output class information for testing and location information for testing on a monitored vehicle included in a test image taken from the monitoring vehicle; and (b) the testing device instructing the cue information extracting layer to perform the operations by using the class information for testing and the location information for testing on the monitored vehicle, to thereby output one or more pieces of cue information for testing on the monitored vehicle, and instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle.

As one example, the detector is a vehicle detector based on an R-CNN (Region-based Convolutional Neural Network) including: one or more convolutional layers which generate a feature map for testing from the test image, an RPN (Region Proposal Network) which generates an ROI (Region Of Interest) for testing of the monitored vehicle from the feature map for testing, a pooling layer which generates a feature vector for testing by pooling an area, in the feature map for testing, corresponding to the ROI for testing, at least one FC layer for the vehicle detection which performs at least one fully connected operation on the feature vector for testing, to thereby generate one or more FC output values, a classification layer which outputs the class information for testing on the monitored vehicle by referring to the FC output values, and a regression layer which outputs the location information for testing on the monitored vehicle by referring to the FC output values.

As one example, the testing device instructs the CNN to receive a concatenated value for testing acquired by using said pieces of cue information for testing on the monitored vehicle generated by the cue information extracting layer and the feature vector for testing generated by the pooling layer of the detector, as an input to the FC layer for monitoring the blind spots.

As one example, the FC layer for monitoring the blind spots includes a neural network capable of outputting a result value for testing of whether the monitored vehicle is located on one of the blind spots by a multilayer perceptron to which said pieces of cue information for testing or their processed values on the monitored vehicle are inputted.

As one example, said pieces of cue information for testing on the monitored vehicle include at least part of (i) the class information for testing on the monitored vehicle, (ii) the location information for testing on the monitored vehicle, (iii) size information for testing on the monitored vehicle corresponding to an ROI size, (iv) aspect ratio information for testing on the monitored vehicle, and (v) distance information for testing between a center of the monitored vehicle and one of outer sides of the blind spots.

As one example, the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information for testing between the center of the monitored vehicle and said one of the outer sides of the blind spots, and further outputs relative location information for testing in addition to the distance information for testing in order to determine whether the center of the monitored vehicle is located inside or outside of said one of the outer sides of the blind spots.

As one example, the monitoring vehicle for the testing device is not identical to the monitoring vehicle for the learning device.

In accordance with still another aspect of the present invention, there is provided a learning device of a CNN (Convolutional Neural Network) for monitoring one or more blind spots of a monitoring vehicle, including: a communication part for receiving a training image corresponding to at least one video image taken from the monitoring vehicle; and a processor for (I) instructing a detector on the monitoring vehicle to output class information and location information on a monitored vehicle included in the training image, (II) instructing a cue information extracting layer to perform one or more operations by using the class information and the location information on the monitored vehicle, to thereby output one or more pieces of cue information on the monitored vehicle, and instructing an FC layer for monitoring the blind spots to perform one or more neural network operations by using said pieces of cue information or their processed values on the monitored vehicle, to thereby output a result of determining whether the monitored vehicle is located on one of the blind spots of the monitoring vehicle, and (III) instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection.

As one example, the detector is a vehicle detector based on an R-CNN (Region-based Convolutional Neural Network) including: one or more convolutional layers which generate a feature map from the training image, an RPN (Region Proposal Network) which generates an ROI (Region Of Interest) of the monitored vehicle from the feature map, a pooling layer which generates a feature vector by pooling an area, in the feature map, corresponding to the ROI, at least one FC layer for the vehicle detection which performs at least one fully connected operation on the feature vector, to thereby generate one or more FC output values, a classification layer which outputs the class information on the monitored vehicle by referring to the FC output values, and a regression layer which outputs the location information on the monitored vehicle by referring to the FC output values.

As one example, the loss values for the vehicle detection include one or more class loss values and one or more location loss values of the monitored vehicle, wherein the processor learns one or more parameters of the FC layer for the vehicle detection and one or more parameters of the convolutional layers by backpropagating the class loss values and the location loss values.

As one example, the processor instructs the CNN to receive a concatenated value acquired by using said pieces of cue information on the monitored vehicle generated by the cue information extracting layer and the feature vector generated by the pooling layer of the detector, as an input to the FC layer for monitoring the blind spots.

As one example, the FC layer for monitoring the blind spots includes a neural network capable of outputting a result value of whether the monitored vehicle is located on one of the blind spots by a multilayer perceptron to which said pieces of cue information on the monitored vehicle are inputted.

As one example, said pieces of cue information on the monitored vehicle include at least part of (i) the class information on the monitored vehicle, (ii) the location information on the monitored vehicle, (iii) size information on the monitored vehicle corresponding to an ROI (Region Of Interest) size, (iv) aspect ratio information on the monitored vehicle, and (v) distance information between a center of the monitored vehicle and one of outer sides of the blind spots.

As one example, the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information between the center of the monitored vehicle and said one of the outer sides of the blind spots, and further outputs relative location information in addition to the distance information in order to determine whether the center of the monitored vehicle is located inside or outside of said one of the outer sides of the blind spots.

In accordance with still yet another aspect of the present invention, there is provided a testing device of a CNN (Convolutional Neural Network) for monitoring one or more blind spots of a monitoring vehicle, including: a communication part for, on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, acquiring class information for testing and location information for testing on the monitored vehicle form the detector which detects the monitored vehicle in a test image taken from the monitoring vehicle; and a processor for (I) instructing the cue information extracting layer to perform the operations by using the class information for testing and the location information for testing on the monitored vehicle, to thereby output one or more pieces of cue information for testing on the monitored vehicle, and (II) instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle.

As one example, the detector is a vehicle detector based on an R-CNN (Region-based Convolutional Neural Network) including: one or more convolutional layers which generate a feature map for testing from the test image, an RPN (Region Proposal Network) which generates an ROI (Region Of Interest) for testing of the monitored vehicle from the feature map for testing, a pooling layer which generates a feature vector for testing by pooling an area, in the feature map for testing, corresponding to the ROI for testing, at least one FC layer for the vehicle detection which performs at least one fully connected operation on the feature vector for testing, to thereby generate one or more FC output values, a classification layer which outputs the class information for testing on the monitored vehicle by referring to the FC output values, and a regression layer which outputs the location information for testing on the monitored vehicle by referring to the FC output values.

As one example, the processor instructs the CNN to receive a concatenated value for testing acquired by using said pieces of cue information for testing on the monitored vehicle generated by the cue information extracting layer and the feature vector for testing generated by the pooling layer of the detector, as an input to the FC layer for monitoring the blind spots.

As one example, the FC layer for monitoring the blind spots includes a neural network capable of outputting a result value for testing of whether the monitored vehicle is located on one of the blind spots by a multilayer perceptron to which said pieces of cue information for testing or their processed values on the monitored vehicle are inputted.

As one example, said pieces of cue information for testing on the monitored vehicle include at least part of (i) the class information for testing on the monitored vehicle, (ii) the location information for testing on the monitored vehicle, (iii) size information for testing on the monitored vehicle corresponding to an ROI size, (iv) aspect ratio information for testing on the monitored vehicle, and (v) distance information for testing between a center of the monitored vehicle and one of outer sides of the blind spots.

As one example, the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information for testing between the center of the monitored vehicle and said one of the outer sides of the blind spots, and further outputs relative location information for testing in addition to the distance information for testing in order to determine whether the center of the monitored vehicle is located inside or outside of said one of the outer sides of the blind spots.

As one example, the monitoring vehicle for the testing device is not identical to the monitoring vehicle for the learning device.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
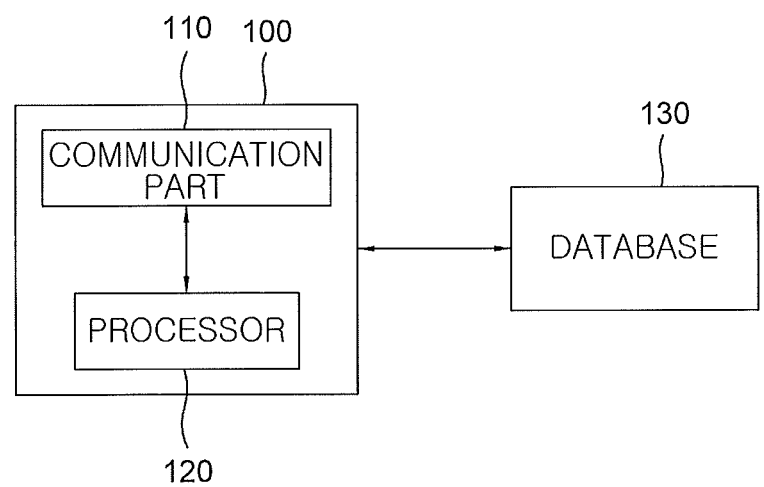
FIG. 1 is a drawing schematically illustrating a learning device for monitoring blind spots of a monitoring vehicle in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits, and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached drawings will be explained in detail as shown below.

FIG. 1 is a drawing schematically illustrating a learning device 100 for monitoring blind spots of a monitoring vehicle in accordance with one example embodiment of the present invention and, by referring to FIG. 1, the learning device 100 may include a communication part 110 and a processor 120.

First, the communication part 110 may receive training data corresponding to at least one output signal from a detector on the monitoring vehicle. That is, the communication part 110 may receive the output signal from the detector in following detailed description as an input signal, i.e., the training data.

Herein, the training data, as information on monitored vehicles in an image corresponding to an input video from the detector, may include class information on objects such as the monitored vehicles and location information on areas where the monitored vehicles are located in the image. Additionally, the training data may be stored in a database 130 where GT, i.e., ground truth, of the class information and the location information on each of the monitored vehicles corresponding to the training data may be stored.

Next, the processor 120 may perform a first process of instructing a cue information extracting layer to perform one or more operations by using the class information and the location information on a monitored vehicle included in the training data, to thereby output one or more pieces of cue information on the monitored vehicle, a second process of instructing an FC layer for monitoring the blind spots to perform one or more neural network operations by using said pieces of cue information on the monitored vehicle, to thereby output a result of determining whether the monitored vehicle is located on one of the blind spots of the monitoring vehicle, and a third process of instructing a loss layer to generate one or more loss values by referring to the result and its corresponding GT, to thereby learn one or more parameters of the FC layer for monitoring the blind spots by backpropagating the loss values.

Herein, the learning device 100 in accordance with one example embodiment of the present invention may be a computing device and may include any device having a processor capable of computation in accordance with the present invention. Also, FIG. 1 represents one learning device 100 but the scope of the present invention is not limited thereto. That is, the learning device 100 may be configured as several devices to perform its functions.

Figure 2:
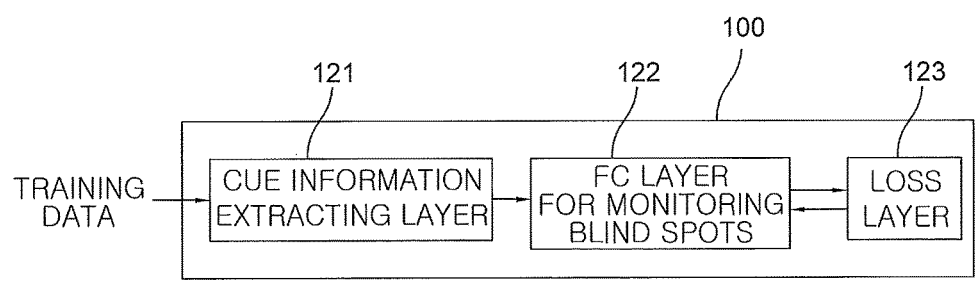
FIG. 2 is a drawing schematically illustrating a learning method for monitoring the blind spots in accordance with one example embodiment of the present invention.

A learning method for monitoring the blind spot of the monitoring vehicle by using the learning device configured as aforementioned in accordance with one example embodiment of the present invention may be explained as below, by referring to FIG. 2.

First of all, if the training data corresponding to the output signal from the detector on the monitoring vehicle is inputted, the learning device 100 may instruct the cue information extracting layer 121 to perform the operations by using the class information and the location information on the monitored vehicle included in the training data, to thereby output said pieces of cue information on the monitored vehicle.

Herein, the detector capable of detecting the monitored vehicle in an image acquired by a vision sensor may be configured with a hypothesis generation stage of detecting an ROI (Region Of Interest), i.e., an area where the monitored vehicle is presumed to be located in the image, and a hypothesis verification stage of determining whether the detected ROI actually includes the monitored vehicle. Also, the hypothesis generation stage may be implemented with a motion-based scheme using optical flows, an appearance-based scheme using shadow underneath vehicles, corners, vertical and horizontal edges, symmetry, color, vehicle's lights, stereo cameras, multiple features, or the like, and the hypothesis verification stage may be implemented with a correlation-based scheme using template matching, a learning-based scheme using features and classifiers, or the like. Especially, the learning-based scheme may adopt a deep learning based algorithm such as a CNN, or a shallow learning based algorithm such as a decision tree, an SVM (Support Vector Machine), an AdaBoost, k-nearest neighbors, etc.

Moreover, said pieces of cue information on the monitored vehicle may include at least part of (i) the class information on the monitored vehicle, (ii) the location information on the monitored vehicle, (iii) size information on the monitored vehicle corresponding to an ROI size, (iv) aspect ratio information on the monitored vehicle, and (v) distance information between a center of the monitored vehicle and one of outer sides of the blind spots.

Herein, the class information on the monitored vehicle may include class information for classifying the monitored vehicle as a car, a motorcycle, etc.

Figure 3:
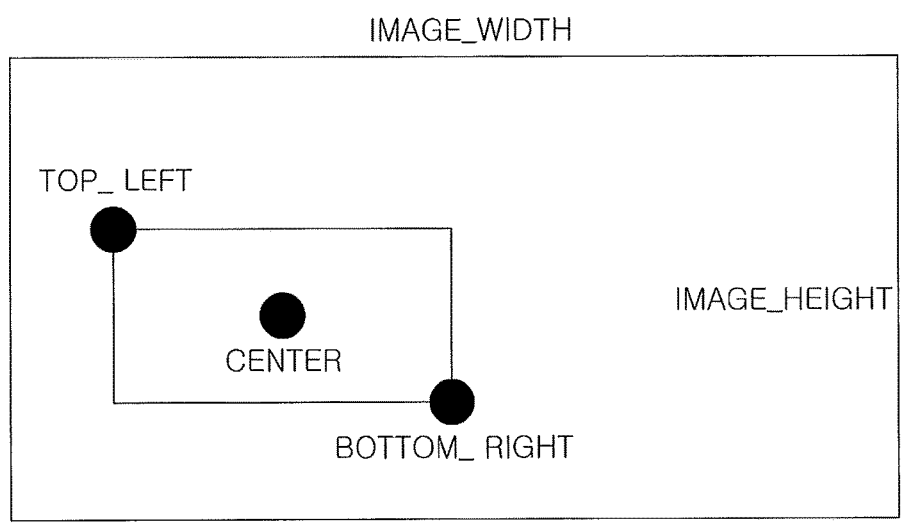
FIG. 3 is a drawing schematically illustrating location information on a monitored vehicle among one or more pieces of cue information on the monitored vehicle in the learning method for monitoring the blind spots in accordance with one example embodiment of the present invention.

Also, by referring to FIG. 3, the location information on the monitored vehicle may include information on a location corresponding to an area where the monitored vehicle is located in the image. For example, coordinates of the top-left and the bottom-right corners of a bounding box in the image may be included, as information on a location of the bounding box corresponding to the monitored vehicle. Coordinates of a center of the bounding box, which may be calculated by using the coordinates of the top-left and the bottom-right corners of the bounding box, may further be included.

Figure 4:
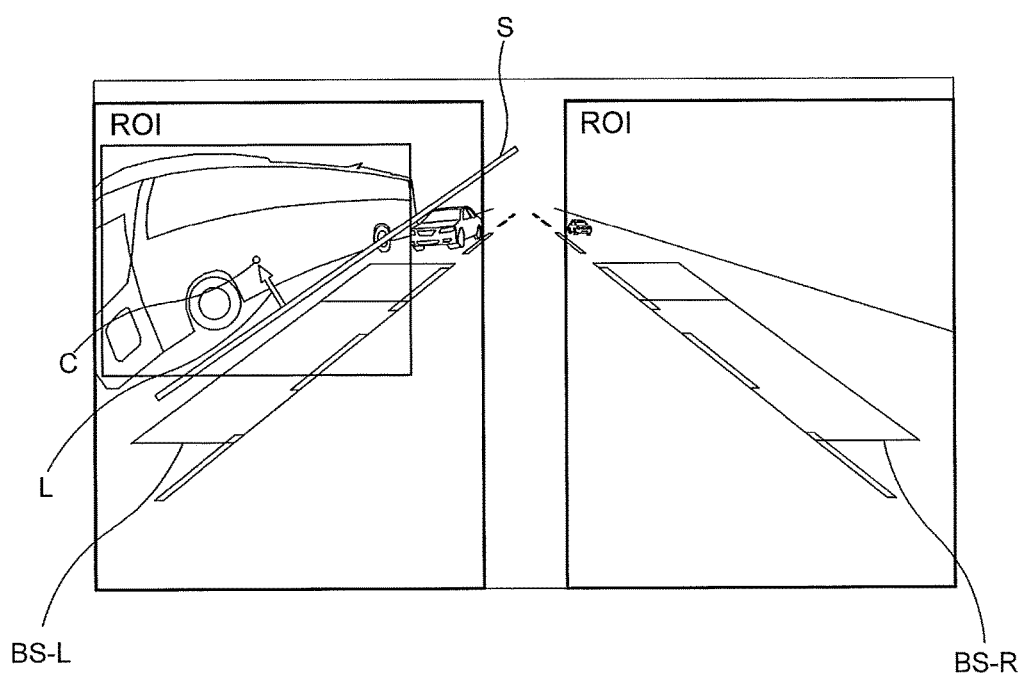
FIG. 4 is a drawing schematically illustrating distance information between a center of the monitored vehicle and one of outer sides of the blind spots among said pieces of cue information on the monitored vehicle in the learning method for monitoring the blind spots in accordance with one example embodiment of the present invention.

Additionally, by referring to FIG. 4, a smaller value among either of (i) a distance of one outer boundary of the blind spot BS-L from the center of the monitored vehicle and (ii) a distance of the other outer boundary of the blind spot BS-R from the center thereof may be determined as the distance information L. Herein, the distance information L may further include relative location information, e.g., information on plus sign or negative sign, to determine whether the center of the monitored vehicle is located inside or outside of said one of outer sides of the blind spots.

Next, the learning device 100 may instruct the FC layer 122 for monitoring the blind spots to perform the neural network operations by using said pieces of the cue information on the monitored vehicle, to thereby output the result of determining whether the monitored vehicle is located on said one of the blind spots of the monitoring vehicle.

Figure 5:
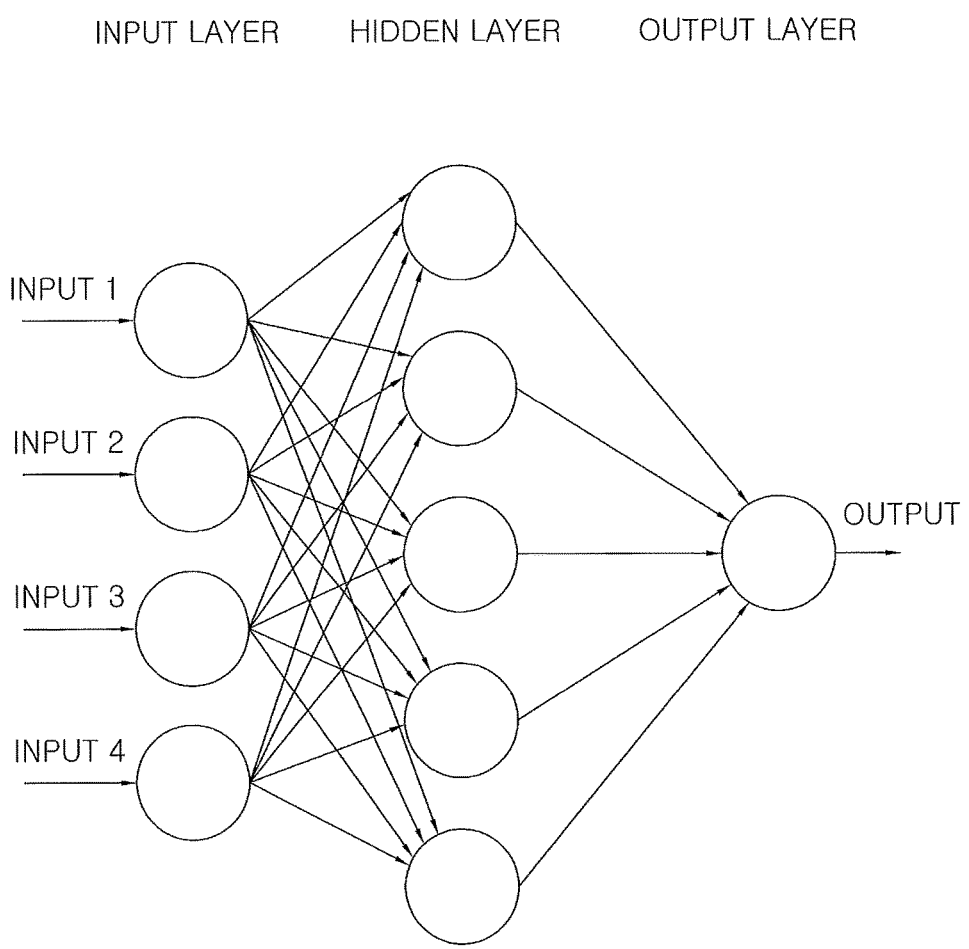
FIG. 5 is a drawing schematically illustrating an FC layer for monitoring the blind spots in the learning method for monitoring the blind spots in accordance with one example embodiment of the present invention.

By referring to FIG. 5, the FC layer 122 for monitoring the blind spots may include a neural network capable of outputting a result value of whether the monitored vehicle is located on said one of the blind spots by a multilayer perceptron to which said pieces of cue information on the monitored vehicle are inputted. In FIG. 5, the number of inputs is represented as four, i.e., input1, input2, input3, and input4, for convenience of explanation, but the number of the inputs may be determined as corresponding to said pieces of cue information generated by the cue information extracting layer 121. Also, although a hidden layer is represented by one layer in FIG. 5, the scope of the present invention is not limited thereto, and the hidden layer may include multiple layers.

Next, the learning device 100 may instruct the loss layer 123 to generate the loss values by referring to the result from the FC layer 122 for monitoring the blind spots and its corresponding GT, to thereby learn the parameters of the FC layer 122 by backpropagating the loss values.

The cue information extracting layer 121, the FC layer 122, and the loss layer 123 may be included in one computing device or in different computing devices, and may also be implemented as an algorithm performing the operations previously mentioned, in any computing devices.

Figure 6:
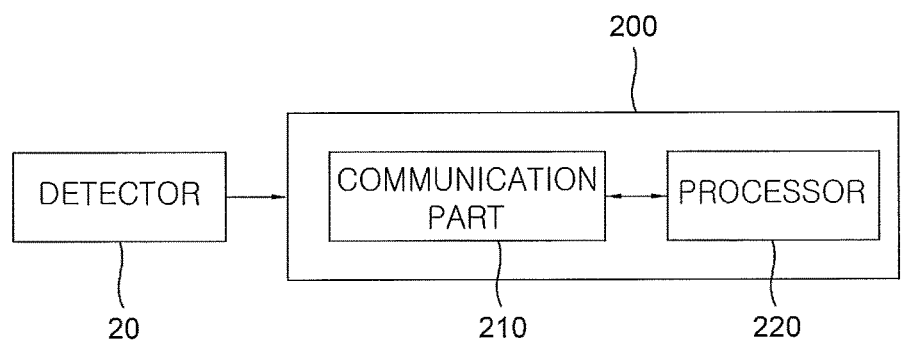
FIG. 6 is a drawing schematically illustrating a testing device for monitoring the blind spots in accordance with one example embodiment of the present invention.

FIG. 6 is a drawing schematically illustrating a testing device 200 for monitoring blind spots of a monitoring vehicle, which may or may not be the same as the monitoring vehicle mentioned previously, in accordance with one example embodiment of the present invention, and the testing device 200 may include a communication part 210 and a processor 220 by referring to FIG. 6.

First of all, the communication part 210 may receive class information for testing and location information for testing on a monitored vehicle from a detector 20 which detects the monitored vehicle in a test image taken from the monitoring vehicle.

Next, the processor 220 may perform a first process of instructing the cue information extracting layer to perform the operations by using the class information for testing and the location information for testing on the monitored vehicle, to thereby output one or more pieces of cue information for testing on the monitored vehicle, and a second process of instructing the FC layer for monitoring the blind spots to perform the neural network operations by using said pieces of cue information for testing or their processed values on the monitored vehicle, to thereby output a result for testing of whether the monitored vehicle is located on one of the blind spots of the monitoring vehicle.

Hereinafter, "for training" and "for testing" may be used to distinguish the testing method from the aforementioned learning method.

Herein, the FC layer for monitoring the blind spots has learned one or more parameters of the learning device using the learning method explained by referring to FIGS. 1 to 5, and the learning method may be briefly explained as follows. The learning device, (i) if the training data corresponding to at least one output signal from the detector 20 on the monitoring vehicle has been inputted, has instructed the cue information extracting layer to perform the operations by using class information for training and location information for training on the monitored vehicle included in the training data, to thereby output one or more pieces of cue information for training on the monitored vehicle, (ii) has instructed the FC layer for monitoring the blind spots to perform the neural network operations by using said pieces of cue information for training on the monitored vehicle, to thereby output a result for training of determining whether the monitored vehicle is located on said one of the blind spots of the monitoring vehicle, and (iii) has instructed the loss layer to generate one or more loss values by referring to the result for training and its corresponding GT, to thereby learn the parameters of the FC layer for monitoring the blind spots by backpropagating the loss values.

Additionally, the testing device 200 in accordance with one example embodiment of the present invention may be a computing device and may include any device having a processor capable of computation in accordance with the present invention. Also, FIG. 6 represents one testing device 200 but the scope of the present invention is not limited thereto. That is, the testing device 200 may be configured as several devices to perform its functions.

Figure 7:
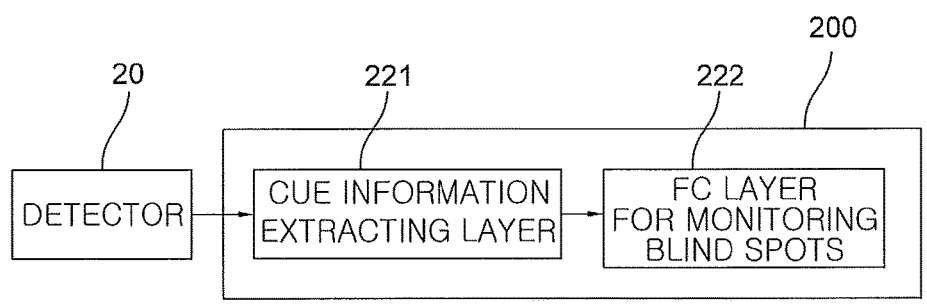
FIG. 7 is a drawing schematically illustrating a testing method for monitoring the blind spots in accordance with one example embodiment of the present invention.

A testing method for monitoring the blind spots using the testing device for monitoring the blind spots configured as aforementioned in accordance with one example embodiment of the present invention may be explained as below, by referring to FIG. 7.

First of all, before performing the testing method, on condition that the learning device (i) has instructed the cue information extracting layer 221 to perform the operations by using the class information for training and the location information for training on the monitored vehicle included in the training data corresponding to the output signal from the detector 20, to thereby output said pieces of cue information on the monitored vehicle, (ii) has instructed the FC layer for monitoring the blind spots to perform the neural network operations by using said pieces of cue information, to thereby output the result for training whether the monitored vehicle is located on the blind spots of the monitoring vehicle, and (iii) has instructed the loss layer to generate the loss values by referring to the result for training and its corresponding GT, to thereby learn the parameters of the FC layer for monitoring the blind spots by backpropagating the loss values, the detector 20 may detect the monitored vehicle in the test image taken from the monitoring vehicle and may output the class information for testing and the location information for testing on the monitored vehicle.

Herein, the detector 20 capable of detecting the monitored vehicle in an image acquired by a vision sensor may be configured with a hypothesis generation stage of detecting an ROI, i.e., an area where the monitored vehicle is presumed to be located in the image, and a hypothesis verification stage of determining whether the detected ROI actually includes the monitored vehicle. Also, the hypothesis generation stage may be implemented with a motion-based scheme using optical flows, an appearance-based scheme using shadow underneath vehicles, corners, vertical and horizontal edges, symmetry, color, vehicle's lights, stereo cameras, multiple features, or the like, and the hypothesis verification stage may be implemented with a correlation-based scheme using template matching, a learning-based scheme using features and classifiers, or the like. Especially, the learning-based scheme may adopt a deep learning based algorithm, such as a CNN, or a shallow learning based algorithm, such as a decision tree, an SVM (Support Vector Machine), an AdaBoost, k-nearest neighbors, etc.

Figure 8:
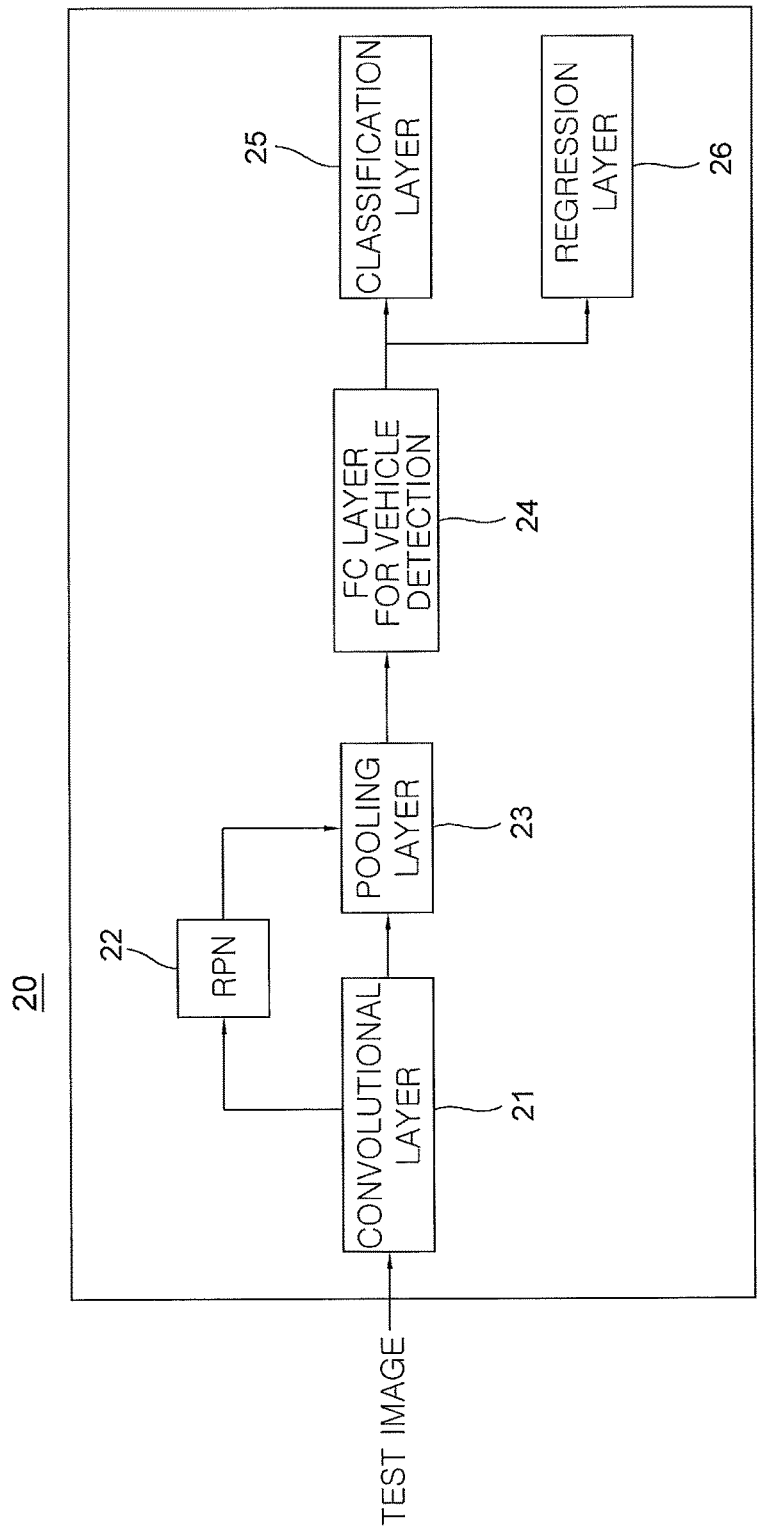
FIG. 8 is a diagram schematically illustrating a detector used in the testing device for monitoring the blind spots in accordance with one example embodiment of the present invention.

As one example, by referring to FIG. 8, the detector 20 may be a vehicle detector based on an R-CNN (Region-based Convolutional Neural Network) including a convolutional layer 21 which generates a feature map for testing from the test image, an RPN (Region Proposal Network) 22 which generates an ROI for testing of the monitored vehicle from the feature map for testing, a pooling layer 23 which generates a feature vector for testing by pooling an area, in the feature map for testing, corresponding to the ROI for testing, at least one FC layer 24 for vehicle detection which performs at least one fully connected operation on the feature vector for testing, to thereby generate one or more FC output values, a classification layer 25 which outputs the class information for testing on the monitored vehicle by referring to the FC output values, and a regression layer 26 which outputs the location information for testing on the monitored vehicle by referring to the FC output values. Herein, each of the convolutional layer 21 and the FC layer 24 is presented as one layer, but the scope of the present invention is not limited thereto and each of them may be comprised of multiple layers. Also, the feature map for testing may be outputted in form of one or more feature maps corresponding to a depth of a channel, from the convolutional layer 21.

Then, the testing device 200 may instruct the cue information extracting layer 221 to perform the operations by using the class information for testing and the location information for testing on the monitored vehicle, to thereby output said pieces of cue information for testing on the monitored vehicle.

Herein, said pieces of cue information for testing on the monitored vehicle may include at least part of (i) the class information for testing on the monitored vehicle, (ii) the location information for testing on the monitored vehicle, (iii) size information for testing on the monitored vehicle corresponding to an ROI size for testing, (iv) aspect ratio information for testing on the monitored vehicle, and (v) distance information for testing between a center of the monitored vehicle and one of outer sides of the blind spots.

Also, the class information for testing on the monitored vehicle may include class information for classifying the monitored vehicle as a car, a motorcycle, etc.

In addition, as explained by referring to FIG. 3, the location information for testing on the monitored vehicle may include information on a location corresponding to an area where the monitored vehicle is located in the test image. For example, coordinates of the top-left and the bottom-right corners of a bounding box in the test image may be included, as information on a location of the bounding box corresponding to the monitored vehicle. Coordinates of a center of the bounding box, which may be calculated by using the coordinates of the top-left and the bottom-right corners of the bounding box, may be further included.

Additionally, as explained by referring to FIG. 4, a smaller value among either of (i) a distance of one outer boundary of the blind spot BS-L from the center of the monitored vehicle and (ii) a distance of the other outer boundary of the blind spot BS-R from the center thereof may be determined as the distance information L for testing. Herein, the distance information L for testing may include relative location information for testing, e.g., information on plus sign or negative sign, to determine whether the center of the monitored vehicle is located inside or outside of said one of outer sides of the blind spots.

Next, the testing device 200 may instruct the FC layer 222 for monitoring the blind spots to perform the neural network operations by using said pieces of the cue information for testing or their processed values on the monitored vehicle, to thereby output a result for testing of determining whether the monitored vehicle is located on said one of the blind spots of the monitoring vehicle.

Herein, the processed values of said pieces of cue information for testing may represent a concatenated value acquired by using said pieces of cue information for testing on the monitored vehicle generated by the cue information extracting layer 221 and the feature vector for testing generated by the pooling layer 23 of the detector 20. A feature concatenation layer capable of concatenating said pieces of cue information for testing and the feature vector for testing may be located before the FC layer 222 for monitoring the blind spots.

Also, as explained by referring to FIG. 5, the FC layer 222 may include the neural network capable of outputting a result value of whether the monitored vehicle is located on said one of the blind spots by the multilayer perceptron to which said pieces of cue information for testing or their processed values on the monitored vehicle are inputted.

The cue information extracting layer 221 and the FC layer 222 for monitoring the blind spots may be included in one computing device or in different computing devices, and may also be implemented as an algorithm performing the operations previously mentioned, in any computing devices.

Figure 9:
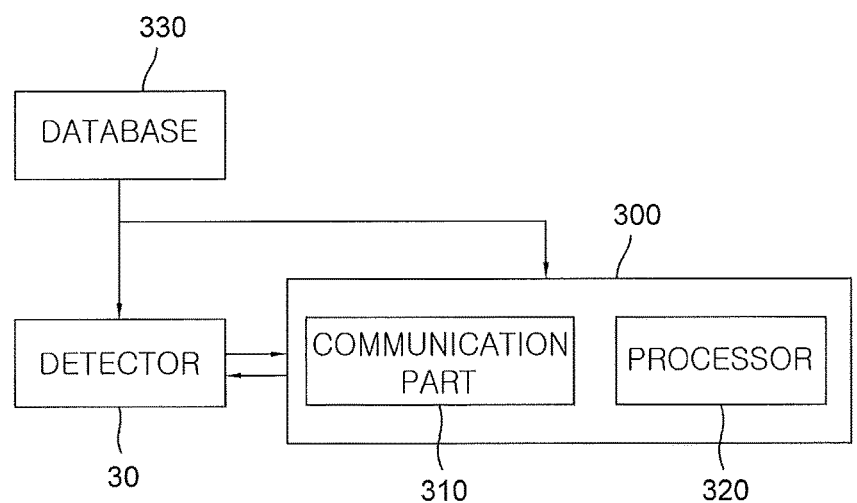
FIG. 9 is a drawing schematically illustrating a learning device for monitoring blind spots of a monitoring vehicle in accordance with another example embodiment of the present invention.

FIG. 9 is a drawing schematically illustrating a learning device 300 for monitoring blind spots of a monitoring vehicle in accordance with another example embodiment of the present invention, and the learning device 300 may include a communication part 310 and a processor 320 by referring to FIG. 9.

First of all, the communication part 310 may receive a training image corresponding to at least one video image taken from the monitoring vehicle.

Herein, the training image may be stored in a database 330 where at least one GT of class information and location information on a monitored vehicle corresponding to the training image may be stored.

Next, the processor 320 may perform a first process of instructing a detector 30 on the monitoring vehicle to output the class information and the location information on the monitored vehicle, a second process of instructing a cue information extracting layer to perform one or more operations by using the class information and the location information on the monitored vehicle, to thereby output one or more pieces of cue information on the monitored vehicle, and instructing an FC layer for monitoring the blind spots to perform one or more neural network operations by using said pieces of cue information or their processed values on the monitored vehicle, to thereby output a result of determining whether the monitored vehicle is located on one of the blind spots, and a third process of instructing a first loss layer to generate one or more loss values for the blind spots by referring to the result and its corresponding first GT, to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection.

Herein, the learning device 300 in accordance with another example embodiment of the present invention may be a computing device and may include any device having a processor capable of computation in accordance with the present invention. Also, FIG. 9 represents one learning device 300 but the scope of the present invention is not limited thereto. That is, the learning device 300 may be configured as several devices to perform its functions.

Figure 10:
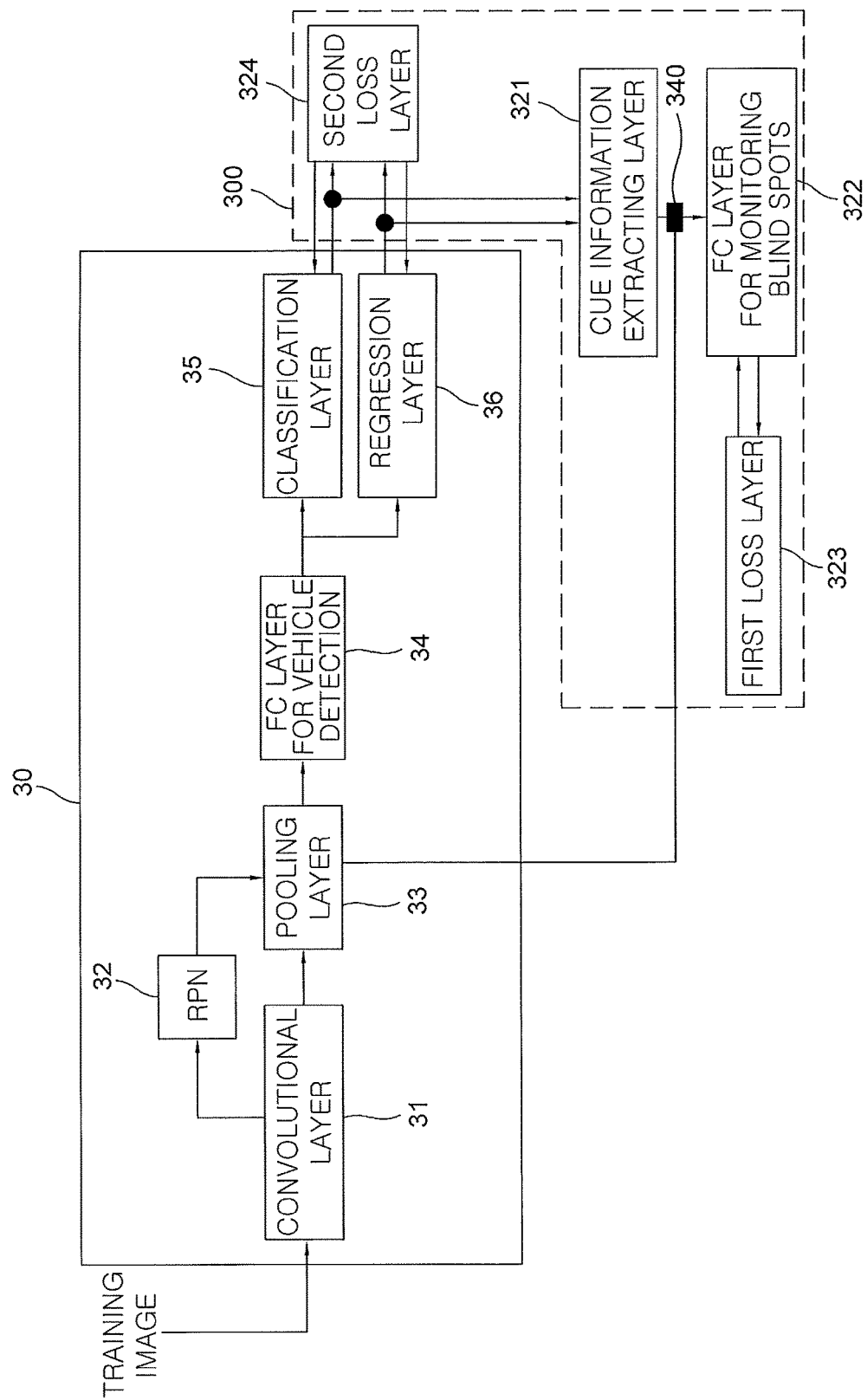
FIG. 10 is a diagram schematically illustrating a learning method for monitoring the blind spots in accordance with another example embodiment of the present invention.

A learning method for monitoring the blind spot of the monitoring vehicle by using the learning device configured as aforementioned in accordance with another example embodiment of the present invention may be explained as below, by referring to FIG. 10.

First, if the training image corresponding to the video image taken from the monitoring vehicle is inputted, the detector 30 may output the class information and the location information on the monitored vehicle included in the training image.

Herein, the detector 30 capable of detecting the monitored vehicle in an image acquired by a vision sensor may be configured with a hypothesis generation stage of detecting an ROI, i.e., an area where the monitored vehicle is presumed to be located in the image, and a hypothesis verification stage of determining whether the detected ROI actually includes the monitored vehicle. Also, the hypothesis generation stage may be implemented with a motion-based scheme using optical flows, an appearance-based scheme using shadow underneath vehicles, corners, vertical and horizontal edges, symmetry, color, vehicle's lights, stereo cameras, multiple features, or the like, and the hypothesis verification stage may be implemented with a correlation-based scheme using template matching, a learning-based scheme using features and classifiers, or the like. Especially, the learning-based scheme may adopt a deep learning based algorithm, such as a CNN, or a shallow learning based algorithm, such as a decision tree, an SVM (Support Vector Machine), an AdaBoost, k-nearest neighbors, etc.

As one example, similarly to the detector explained by referring to FIG. 8, the detector 30 may be a vehicle detector based on an R-CNN, including a convolutional layer 31 which generates a feature map from the training image, an RPN 32 which generates the ROI of the monitored vehicle from the feature map, a pooling layer 33 which generates a feature vector by pooling an area, in the feature map, corresponding to the ROI, and at least one FC layer 34 for the vehicle detection which performs at least one fully connected operation on the feature vector to thereby generate one or more FC output values, a classification layer 35 which outputs the class information on the monitored vehicle by referring to the FC output values, and a regression layer 36 which outputs the location information on the monitored vehicle by referring to the FC output values. Herein, the convolutional layer 31 may be comprised of at least one layer and the FC layer 34 may also be comprised of at least one layer.

Next, the learning device 300 may instruct the cue information extracting layer 321 to perform the operations by using the class information and the location information on the monitored vehicle, to thereby output said pieces of cue information on the monitored vehicle.

Herein, said pieces of cue information on the monitored vehicle may include at least part of (i) the class information on the monitored vehicle, (ii) the location information on the monitored vehicle, (iii) size information on the monitored vehicle corresponding to an ROI size, (iv) aspect ratio information on the monitored vehicle, and (v) distance information between a center of the monitored vehicle and one of outer sides of the blind spots.

Also, the class information on the monitored vehicle may include class information for classifying the monitored vehicle as a car, a motorcycle, etc.

Additionally, similarly as explained by referring to FIG. 3, the location information on the monitored vehicle may include information on a location corresponding to an area where the monitored vehicle is located in the image. For example, coordinates of the top-left and the bottom-right corners of a bounding box in the image may be included, as information on a location of the bounding box corresponding to the monitored vehicle. Coordinates of a center of the bounding box, which may be calculated by using the coordinates of the top-left and the bottom-right corners of the bounding box, may be further included.

Additionally, similarly as explained by referring to FIG. 4, a smaller value among either of (i) a distance of one outer boundary of the blind spot BS-L from the center of the monitored vehicle and (ii) a distance of the other outer boundary of the blind spot BS-R from the center thereof may be determined as the distance information L. Herein, the distance information L may include relative location information, e.g., information on plus sign or negative sign, to determine whether the center of the monitored vehicle is located inside or outside of said one of outer sides of the blind spots.

Next, the learning device 300 may instruct the FC layer 322 for monitoring the blind spots to perform the neural network operations by using said pieces of the cue information or their processed values on the monitored vehicle, to thereby output the result of determining whether the monitored vehicle is located on said one of the blind spots of the monitoring vehicle.

Herein, the processed values of said pieces of cue information may represent a concatenated value acquired by using said pieces of cue information on the monitored vehicle generated by the cue information extracting layer 321 and the feature vector generated by the pooling layer 33 of the detector 30. A feature concatenation layer 340, which generates the concatenated value including said pieces of cue information and the feature vector, may be located before the FC layer 322 for monitoring the blind spots.

Also, similarly as explained by referring to FIG. 5, the FC layer 322 may include a neural network capable of outputting a result value of whether the monitored vehicle is located on said one of the blind spots by a multilayer perceptron to which said pieces of cue information or their processed values on the monitored vehicle are inputted.

Next, the learning device 300 may instruct the first loss layer 323 to generate the loss values for the blind spots by referring to (i) the result of determining whether the monitored vehicle is located on said one of the blind spots of the monitoring vehicle and (ii) its corresponding first GT, to thereby learn the parameters of the FC layer 322 for monitoring the blind spots by backpropagating the loss values for the blind spots, and instructing the second loss layer 324 to generate the loss values for the vehicle detection by referring to the class information and the location information on the monitored vehicle and their corresponding second GT, to thereby learn the parameters of the detector 30 by backpropagating the loss values for the vehicle detection.

Herein, the loss values for the vehicle detection may include one or more class loss values and one or more location loss values of the monitored vehicle, and the learning device 300 may learn one or more parameters of the FC layer 34 for the vehicle detection and one or more parameters of the convolutional layer 31 of the detector 30 by backpropagating the class loss values and the location loss values. Also, although not illustrated, the learning device 300 may acquire one or more ROI loss values by referring to the ROI, which is generated from the RPN 32 of the detector 30, and ROI GT corresponding to the training image, to thereby learn one or more parameters of the RPN 32 by backpropagating the ROI loss values.

The cue information extracting layer 221 and the FC layer 222 for monitoring the blind spots may be included in one computing device or in different computing devices, and may also be implemented as an algorithm performing the operations previously mentioned, in any computing devices. Additionally, the first loss layer 323 and the second loss layer 324 may be included in one computing device or in different computing devices respectively and may be implemented as an algorithm performing the operations previously mentioned, in any computing devices.

Figure 11:
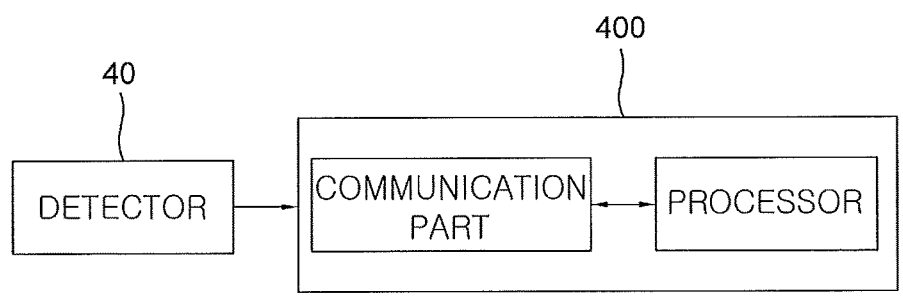
FIG. 11 is a drawing schematically illustrating a testing device for monitoring the blind spots in accordance with another example embodiment of the present invention.

FIG. 11 is a drawing schematically illustrating a testing device 400 for monitoring blind spots of a monitoring vehicle, which may or may not be the same as the monitoring vehicle mentioned previously, in accordance with another example embodiment of the present invention, and the testing device 400 may include a communication part 410 and a processor 420 by referring to FIG. 11.

First of all, the communication part 410 may receive class information for testing and location information for testing on a monitored vehicle from a detector 40 which detects the monitored vehicle in a test image taken from the monitoring vehicle.

Herein, the detector 40 capable of detecting the monitored vehicle in an image acquired by a vision sensor may be configured with a hypothesis generation stage of detecting an ROI, i.e., an area where the monitored vehicle is presumed to be located in the image and a hypothesis verification stage of determining whether the detected ROI actually includes the monitored vehicle. Also, the hypothesis generation stage may be implemented with a motion-based scheme using optical flows, an appearance-based scheme using shadow underneath vehicles, corners, vertical and horizontal edges, symmetry, color, vehicle's lights, stereo cameras, multiple features, or the like, and the hypothesis verification stage may be implemented with a correlation-based scheme using template matching, a learning-based scheme using features and classifiers, or the like. Especially, the learning-based scheme may adopt a deep learning based algorithm, such as a CNN, or a shallow learning based algorithm, such as a decision tree, an SVM (Support Vector Machine), an AdaBoost, k-nearest neighbors, etc.

As one example, similarly to the detector explained by referring to FIG. 8, the detector 40 may be a vehicle detector based on the R-CNN, including the convolutional layer which generates a feature map for testing from the test image, the RPN which generates an ROI for testing of the monitored vehicle from the feature map for testing, the pooling layer which generates a feature vector for testing by pooling an area, in the feature map for testing, corresponding to the ROI for testing, the FC layer for the vehicle detection which performs the fully connected operations by using the feature vector for testing, to thereby generate one or more FC output values, the classification layer which outputs the class information for testing on the monitored vehicle by referring to the FC output values, and the regression layer which outputs the location information for testing on the monitored vehicle by referring to the FC output values. Herein, each of the convolutional layer and the FC layer for the vehicle detection is presented as one layer, but the scope of the present invention is not limited thereto and each of them may be comprised of multiple layers. Also, the feature map for testing may be outputted in form of one or more feature maps corresponding to a depth of a channel, from the convolutional layer 41.

Next, the processor 420 may perform a first process of instructing the cue information extracting layer to perform the operations by using the class information for testing and the location information for testing on the monitored vehicle, to thereby output one or more pieces of cue information for testing on the monitored vehicle, and a second process of instructing the FC layer for monitoring the blind spots to perform the neural network operations by using said pieces of cue information for testing or their processed values on the monitored vehicle, to thereby output a result for testing of whether the monitored vehicle is located on one of the blind spots of the monitoring vehicle.

Hereinafter, "for training" and "for testing" may be used to distinguish the testing method from the aforementioned learning method.

Herein, the detector 40 and the FC layer for monitoring the blind spots have learned the parameters of the learning device using the learning method explained by referring to FIGS. 9 and 10, and the learning method may be briefly explained as follows. If the detector 40 has outputted class information for training and location information for training on the monitored vehicle in a training image corresponding to a video image taken from the monitoring vehicle, the learning device (i) has instructed the cue information extracting layer to perform the operations by using the class information for training and the location information for training on the monitored vehicle, to thereby output one or more pieces of cue information for training on the monitored vehicle, (ii) has instructed the FC layer for monitoring the blind spots to perform the neural network operations by using said pieces of cue information for training or their processed values, to thereby output a result for training of whether the monitored vehicle is located on said one of the blind spots, and (iii) has instructed the first loss layer to generate one or more loss values for the blind spots by referring to the result for training and its corresponding first GT, to thereby learn the parameters of the FC layer for monitoring the blind spots by backpropagating the loss values for the blind spots, and has instructed the second loss layer to generate one or more loss values for the vehicle detection by referring to the class information for training and the location information for training and their corresponding second GT, to thereby learn the parameters of the detector 40 by backpropagating the loss values for the vehicle detection.

Additionally, the testing device 400 in accordance with another example embodiment of the present invention may be a computing device and may include any device having a processor capable of computation in accordance with the present invention. Also, FIG. 11 represents one testing device 400 but the scope of the present invention is not limited thereto. That is, the testing device 400 may be configured as several devices to perform its functions.

Figure 12:
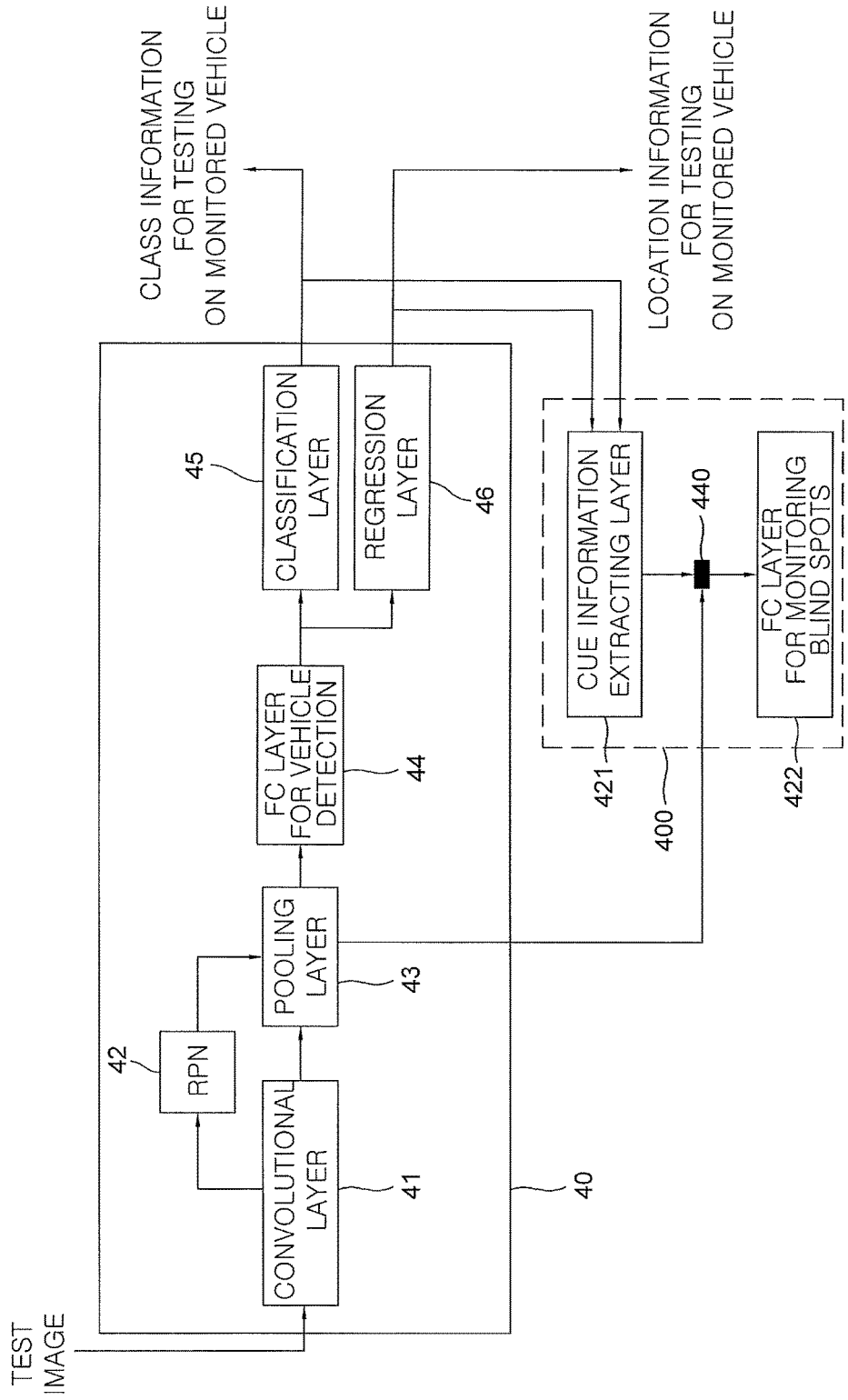
FIG. 12 is a diagram schematically illustrating a testing method for monitoring the blind spots in accordance with another example embodiment of the present invention.

A testing method for monitoring the blind spots using the testing device for monitoring the blind spots configured as aforementioned in accordance with another example embodiment of the present invention may be explained as below, by referring to FIG. 12.

First of all, on condition that if the detector 40 has outputted the class information for training and the location information for training on the monitored vehicle in the training image corresponding to the video image taken from the monitoring vehicle, the learning device (i) has instructed the cue information extracting layer 421 to perform the operations by using the class information for training and location information for training on the monitored vehicle, to thereby output said pieces of cue information for training on the monitored vehicle, (ii) has instructed the FC layer 422 for monitoring the blind spots to perform the neural network operations by using said pieces of cue information for training or their processed values, to thereby output the result for training of whether the monitored vehicle is located on said one of the blind spots, and (iii) has instructed the first loss layer to generate the loss values for the blind spots by referring to the result for training and its corresponding first GT, to thereby learn the parameters of the FC layer 422 for monitoring the blind spots by backpropagating the loss values for the blind spots, and has instructed the second loss layer to generate the loss values for the vehicle detection by referring to the class information for training and the location information for training and their corresponding second GT, to thereby learn the parameters of the detector 40 by backpropagating the loss values for the vehicle detection, the detector 40 may detect the monitored vehicle in a test image taken from the monitoring vehicle, and output the class information for testing and location information for testing on the monitored vehicle.

Herein, the detector 40 capable of detecting the monitored vehicle in an image acquired by the vision sensor may be configured with the hypothesis generation stage of detecting the ROI, i.e., the area where the monitored vehicle is presumed to be located in the image, and the hypothesis verification stage of determining whether the detected ROI actually includes the monitored vehicle. Also, the hypothesis generation stage may be implemented with a motion-based scheme using optical flows, an appearance-based scheme using shadow underneath vehicle, corners, vertical and horizontal edges, symmetry, color, vehicle's lights, stereo cameras, multiple features, or the like, and the hypothesis verification stage may be implemented with a correlation-based scheme using template matching, a learning-based scheme using features and classifiers, or the like. Especially, the learning-based scheme may adopt a deep learning based algorithm, such as a CNN, or a shallow learning based algorithm, such as a decision tree, an SVM (Support Vector Machine), an AdaBoost, k-nearest neighbors, etc.

As one example, the detector 40 may be a vehicle detector based on the R-CNN, including the convolutional layer 41 which generates a feature map for testing from the test image, the RPN 42 which generates the ROI for testing of the monitored vehicle from the feature map for testing, the pooling layer 43 which generates a feature vector for testing by pooling an area, in the feature map for testing, corresponding to the ROI for testing, the FC layer 44 for the vehicle detection which performs the fully connected operation on the feature vector for testing, to thereby generate one or more FC output values, the classification layer 45 which outputs the class information for testing on the monitored vehicle by referring to the FC output values, and the regression layer 46 which outputs the location information for testing on the monitored vehicle by referring to the FC output values. Herein, each of the convolutional layer 41 and the FC layer 44 for the vehicle detection is presented as one layer, but the scope of the present invention is not limited thereto and each of them may be comprised of multiple layers.

Then, the testing device 400 may instruct the cue information extracting layer 421 to perform the operations by using the class information for testing and the location information for testing on the monitored vehicle, to thereby output said pieces of cue information for testing on the monitored vehicle.

Herein, said pieces of cue information for testing on the monitored vehicle may include at least part of (i) the class information for testing on the monitored vehicle, (ii) the location information for testing on the monitored vehicle, (iii) size information for testing on the monitored vehicle corresponding to an ROI size for testing, (iv) aspect ratio information for testing on the monitored vehicle, and (v) distance information for testing between a center of the monitored vehicle and one of outer sides of the blind spots.

Also, the class information for testing on the monitored vehicle may include class information for classifying the monitored vehicle as a car, a motorcycle, etc.

Additionally, similarly as explained by referring to FIG. 3, the location information for testing on the monitored vehicle may include information on a location corresponding to an area where the monitored vehicle is located in the test image. For example, coordinates of the top-left and the bottom-right corners of a bounding box in the test image may be included, as information on a location of the bounding box corresponding to the monitored vehicle. Coordinates of a center of the bounding box, which may be calculated by using the coordinates of the top-left and the bottom-right corners of the bounding box, may be further included.

Additionally, similarly as explained by referring to FIG. 4, a smaller value among either of (i) a distance of one outer boundary of the blind spot BS-L from the center of the monitored vehicle and (ii) a distance of the other outer boundary of the blind spot BS-R from the center thereof may be determined as the distance information L for testing. Herein, the distance information L for testing may include relative location information for testing, e.g., information on plus sign or negative sign, to determine whether the center of the monitored vehicle is located inside or outside of said one of outer sides of the blind spots.

Next, the testing device 400 may instruct the FC layer 422 for monitoring the blind spots to perform the neural network operations by using said pieces of the cue information for testing or their processed values on the monitored vehicle, to thereby output the result for testing of determining whether the monitored vehicle is located on said one of the blind spots of the monitoring vehicle.

Herein, the processed values of said pieces of cue information for testing may represent a concatenated value acquired by using said pieces of cue information for testing on the monitored vehicle generated by the cue information extracting layer 421 and the feature vector for testing generated by the pooling layer 43 of the detector 40. A feature concatenation layer 440, which generates the concatenated value including said pieces of cue information for testing and the feature vector for testing, may be located before the FC layer 422 for monitoring the blind spots.

Also, similarly as explained by referring to FIG. 5, the FC layer 422 for monitoring the blind spots may include the neural network capable of outputting a result value of whether the monitored vehicle is located on said one of the blind spots by the multilayer perceptron to which said pieces of cue information for testing or their processed values on the monitored vehicle are inputted.

The cue information extracting layer 421 and the FC layer 422 for monitoring the blind spots may be included in one computing device or in different computing devices, and also may be implemented as an algorithm performing the operations previously mentioned, in any computing devices.

The present invention has an effect of providing a blind spot monitoring system regardless of the type of a detector which detects a vehicle.

The present invention has another effect of determining whether the vehicle is located on blind spots by using an output signal from the detector, regardless of the type of the detector.

The present invention has still another effect of minimizing cost of maintaining the blind spot monitoring system since the detector in the blind spot monitoring system is replaceable as needed without designing a logic.

The present invention has still yet another effect of no need to design the logic corresponding to each detector for determining whether the vehicle is located on the blind spot, thereby minimizing time required to develop the blind spot monitoring system, as the blind spot monitoring system is adaptable to all detectors.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method of a CNN (Convolutional Neural Network) for monitoring one or more blind spots of a monitoring vehicle, comprising steps of:
    (a) a learning device, if a training image corresponding to at least one video image taken from the monitoring vehicle is inputted, instructing a detector on the monitoring vehicle to output class information and location information on a monitored vehicle included in the training image;
    (b) the learning device instructing a cue information extracting layer to perform one or more operations by using the class information and the location information on the monitored vehicle, to thereby output one or more pieces of cue information on the monitored vehicle, and instructing an FC layer (fully connected layer) for monitoring the blind spots to perform one or more neural network operations by using said pieces of cue information or their processed values on the monitored vehicle, to thereby output a result of determining whether the monitored vehicle is located on one of the blind spots of the monitoring vehicle; and
    (c) the learning device instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection;
    wherein the detector is a vehicle detector based on an R-CNN (Region-based Convolutional Neural Network) including:
    one or more convolutional layers which generate a feature map from the training image,
    an RPN (Region Proposal Network) which generates an ROI (Region Of Interest) of the monitored vehicle from the feature map,
    a pooling layer which generates a feature vector by pooling an area, in the feature map, corresponding to the ROI,
    at least one FC layer for the vehicle detection which performs at least one fully connected operation on the feature vector, to thereby generate one or more FC output values,
    a classification layer which outputs the class information on the monitored vehicle by referring to the FC output values, and
    a regression layer which outputs the location information on the monitored vehicle by referring to the FC output values.

2. The learning method of claim 1, wherein the loss values for the vehicle detection include one or more class loss values and one or more location loss values of the monitored vehicle, and
    wherein the learning device learns one or more parameters of the FC layer for the vehicle detection and one or more parameters of the convolutional layers by backpropagating the class loss values and the location loss values.

3. The learning method of claim 1, wherein the learning device instructs the CNN to receive a concatenated value acquired by using said pieces of cue information on the monitored vehicle generated by the cue information extracting layer and the feature vector generated by the pooling layer of the detector, as an input to the FC layer for monitoring the blind spots.

4. A learning method of a CNN (Convolutional Neural Network) for monitoring one or more blind spots of a monitoring vehicle, comprising steps of:
(a) a learning device, if a training image corresponding to at least one video image taken from the monitoring vehicle is inputted, instructing a detector on the monitoring vehicle to output class information and location information on a monitored vehicle included in the training image;
(b) the learning device instructing a cue information extracting layer to perform one or more operations by using the class information and the location information on the monitored vehicle, to thereby output one or more pieces of cue information on the monitored vehicle, and instructing an FC layer (fully connected layer) for monitoring the blind spots to perform one or more neural network operations by using said pieces of cue information or their processed values on the monitored vehicle, to thereby output a result of determining whether the monitored vehicle is located on one of the blind spots of the monitoring vehicle; and
(c) the learning device instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection,
wherein the FC layer for monitoring the blind spots includes a neural network capable of outputting a result value of whether the monitored vehicle is located on one of the blind spots by a multilayer perceptron to which said pieces of cue information on the monitored vehicle are inputted.

5. A learning method of a CNN (Convolutional Neural Network) for monitoring one or more blind spots of a monitoring vehicle, comprising steps of:
(a) a learning device, if a training image corresponding to at least one video image taken from the monitoring vehicle is inputted, instructing a detector on the monitoring vehicle to output class information and location information on a monitored vehicle included in the training image;
(b) the learning device instructing a cue information extracting layer to perform one or more operations by using the class information and the location information on the monitored vehicle, to thereby output one or more pieces of cue information on the monitored vehicle, and instructing an FC layer (fully connected layer) for monitoring the blind spots to perform one or more neural network operations by using said pieces of cue information or their processed values on the monitored vehicle, to thereby output a result of determining whether the monitored vehicle is located on one of the blind spots of the monitoring vehicle; and
(c) the learning device instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection,
wherein said pieces of cue information on the monitored vehicle include at least part of (i) the class information on the monitored vehicle, (ii) the location information on the monitored vehicle, (iii) size information on the monitored vehicle corresponding to an ROI (Region Of Interest) size, (iv) aspect ratio information on the monitored vehicle, and (v) distance information between a center of the monitored vehicle and one of outer sides of the blind spots.

6. The learning method of claim 5, wherein the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information between the center of the monitored vehicle and said one of the outer sides of the blind spots, and further outputs relative location information in addition to the distance information in order to determine whether the center of the monitored vehicle is located inside or outside of said one of the outer sides of the blind spots.

7. A testing method of a CNN (Convolutional Neural Network) for monitoring one or more blind spots of a monitoring vehicle, comprising steps of:
(a) on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, a testing device instructing a detector on the monitoring vehicle to output class information for testing and location information for testing on a monitored vehicle included in a test image taken from the monitoring vehicle; and (b) the testing device instructing the cue information extracting layer to perform the operations by using the class information for testing and the location information for testing on the monitored vehicle, to thereby output one or more pieces of cue information for testing on the monitored vehicle, and instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle;

wherein the detector is a vehicle detector based on an R-CNN (Region-based Convolutional Neural Network) including:

one or more convolutional layers which generate a feature map for testing from the test image, an RPN (Region Proposal Network) which generates an ROI (Region Of Interest) for testing of the monitored vehicle from the feature map for testing, a pooling layer which generates a feature vector for testing by pooling an area, in the feature map for testing, corresponding to the ROI for testing, at least one FC layer for the vehicle detection which performs at least one fully connected operation on the feature vector for testing, to thereby generate one or more FC output values, a classification layer which outputs the class information for testing on the monitored vehicle by referring to the FC output values, and a regression layer which outputs the location information for testing on the monitored vehicle by referring to the FC output values.

8. The testing method of claim 7, wherein the testing device instructs the CNN to receive a concatenated value for testing acquired by using said pieces of cue information for testing on the monitored vehicle generated by the cue information extracting layer and the feature vector for testing generated by the pooling layer of the detector, as an input to the FC layer for monitoring the blind spots.

9. A testing method of a CNN (Convolutional Neural Network) for monitoring one or more blind spots of a monitoring vehicle, comprising steps of:

(a) on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, a testing device instructing a detector on the monitoring vehicle to output class information for testing and location information for testing on a monitored vehicle included in a test image taken from the monitoring vehicle; and (b) the testing device instructing the cue information extracting layer to perform the operations by using the class information for testing and the location information for testing on the monitored vehicle, to thereby output one or more pieces of cue information for testing on the monitored vehicle, and instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle;

wherein the FC layer for monitoring the blind spots includes a neural network capable of outputting a result value for testing of whether the monitored vehicle is located on one of the blind spots by a multilayer perceptron to which said pieces of cue information for testing or their processed values on the monitored vehicle are inputted.

10. A testing method of a CNN (Convolutional Neural Network) for monitoring one or more blind spots of a monitoring vehicle, comprising steps of:

(a) on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, a testing device instructing a detector on the monitoring vehicle to output class information for testing and location information for testing on a monitored vehicle included in a test image taken from the monitoring vehicle; and (b) the testing device instructing the cue information extracting layer to perform the operations by using the class information for testing and the location information for testing on the monitored vehicle, to thereby output one or more pieces of cue information for testing on the monitored vehicle, and instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle;

wherein said pieces of cue information for testing on the monitored vehicle include at least part of (i) the class information for testing on the monitored vehicle, (ii) the location information for testing on the monitored vehicle, (iii) size information for testing on the monitored vehicle corresponding to an ROI size, (iv) aspect ratio information for testing on the monitored vehicle, and (v) distance information for testing between a center of the monitored vehicle and one of outer sides of the blind spots.

11. The testing method of claim 10, wherein the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information for testing between the center of the monitored vehicle and said one of the outer sides of the blind spots, and further outputs relative location information for testing in addition to the distance information for testing in order to determine whether the center of the monitored vehicle is located inside or outside of said one of the outer sides of the blind spots.

12. A testing method of a CNN (Convolutional Neural Network) for monitoring one or more blind spots of a monitoring vehicle, comprising steps of:

(a) on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, a testing device instructing a detector on the monitoring vehicle to output class information for testing and location information for testing on a monitored vehicle included in a test image taken from the monitoring vehicle; and (b) the testing device instructing the cue information extracting layer to perform the operations by using the class information for testing and the location information for testing on the monitored vehicle, to thereby output one or more pieces of cue information for testing on the monitored vehicle, and instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle, wherein the monitoring vehicle for the testing device is not identical to the monitoring vehicle for the learning device.

13. A learning device of a CNN (Convolutional Neural Network) for monitoring one or more blind spots of a monitoring vehicle, comprising:

a communication part for receiving a training image corresponding to at least one video image taken from the monitoring vehicle; and a processor for (I) instructing a detector on the monitoring vehicle to output class information and location information on a monitored vehicle included in the training image, (II) instructing a cue information extracting layer to perform one or more operations by using the class information and the location information on the monitored vehicle, to thereby output one or more pieces of cue information on the monitored vehicle, and instructing an FC layer (fully connected layer) for monitoring the blind spots to perform one or more neural network operations by using said pieces of cue information or their processed values on the monitored vehicle, to thereby output a result of determining whether the monitored vehicle is located on one of the blind spots of the monitoring vehicle, and (III) instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection, wherein the detector is a vehicle detector based on an R-CNN (Region-based Convolutional Neural Network) including:

one or more convolutional layers which generate a feature map from the training image, an RPN (Region Proposal Network) which generates an ROI (Region Of Interest) of the monitored vehicle from the feature map, a pooling layer which generates a feature vector by pooling an area, in the feature map, corresponding to the ROI, at least one FC layer for the vehicle detection which performs at least one fully connected operation on the feature vector, to thereby generate one or more FC output values, a classification layer which outputs the class information on the monitored vehicle by referring to the FC output values, and a regression layer which outputs the location information on the monitored vehicle by referring to the FC output values.

14. The learning device of claim 13, wherein the loss values for the vehicle detection include one or more class loss values and one or more location loss values of the monitored vehicle, and wherein the processor learns one or more parameters of the FC layer for the vehicle detection and one or more parameters of the convolutional layers by backpropagating the class loss values and the location loss values.

15. The learning device of claim 13, wherein the processor instructs the CNN to receive a concatenated value acquired by using said pieces of cue information on the monitored vehicle generated by the cue information extracting layer and the feature vector generated by the pooling layer of the detector, as an input to the FC layer for monitoring the blind spots.

16. A learning device of a CNN (Convolutional Neural Network) for monitoring one or more blind spots of a monitoring vehicle, comprising:

a communication part for receiving a training image corresponding to at least one video image taken from the monitoring vehicle; and a processor for (I) instructing a detector on the monitoring vehicle to output class information and location information on a monitored vehicle included in the training image, (II) instructing a cue information extracting layer to perform one or more operations by using the class information and the location information on the monitored vehicle, to thereby output one or more pieces of cue information on the monitored vehicle, and instructing an FC layer (fully connected layer) for monitoring the blind spots to perform one or more neural network operations by using said pieces of cue information or their processed values on the monitored vehicle, to thereby output a result of determining whether the monitored vehicle is located on one of the blind spots of the monitoring vehicle, and (III) instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection, wherein the FC layer for monitoring the blind spots includes a neural network capable of outputting a result value of whether the monitored vehicle is located on one of the blind spots by a multilayer perceptron to which said pieces of cue information on the monitored vehicle are inputted.

17. A learning device of a CNN (Convolutional Neural Network) for monitoring one or more blind spots of a monitoring vehicle, comprising:

a communication part for receiving a training image corresponding to at least one video image taken from the monitoring vehicle; and a processor for (I) instructing a detector on the monitoring vehicle to output class information and location information on a monitored vehicle included in the training image, (II) instructing a cue information extracting layer to perform one or more operations by using the class information and the location information on the monitored vehicle, to thereby output one or more pieces of cue information on the monitored vehicle, and instructing an FC layer (fully connected layer) for monitoring the blind spots to perform one or more neural network operations by using said pieces of cue information or their processed values on the monitored vehicle, to thereby output a result of determining whether the monitored vehicle is located on one of the blind spots of the monitoring vehicle, and (III) instructing a first loss layer to generate one or more loss values for the blind spots by referring to the result and its corresponding first GT (Ground Truth), to thereby learn one or more parameters of the FC layer for monitoring the blind spots by backpropagating the loss values for the blind spots, and instructing a second loss layer to generate one or more loss values for vehicle detection by referring to the class information and the location information on the monitored vehicle and their corresponding second GT, to thereby learn one or more parameters of the detector by backpropagating the loss values for the vehicle detection, wherein said pieces of cue information on the monitored vehicle include at least part of (i) the class information on the monitored vehicle, (ii) the location information on the monitored vehicle, (iii) size information on the monitored vehicle corresponding to an ROI (Region Of Interest) size, (iv) aspect ratio information on the monitored vehicle, and (v) distance information between a center of the monitored vehicle and one of outer sides of the blind spots.

18. The learning device of claim 17, wherein the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information between the center of the monitored vehicle and said one of the outer sides of the blind spots, and further outputs relative location information in addition to the distance information in order to determine whether the center of the monitored vehicle is located inside or outside of said one of the outer sides of the blind spots.

19. A testing device of a CNN (Convolutional Neural Network) for monitoring one or more blind spots of a monitoring vehicle, comprising:

a communication part for, on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, acquiring class information for testing and location information for testing on the monitored vehicle form the detector which detects the monitored vehicle in a test image taken from the monitoring vehicle; and a processor for (I) instructing the cue information extracting layer to perform the operations by using the class information for testing and the location information for testing on the monitored vehicle, to thereby output one or more pieces of cue information for testing on the monitored vehicle, and (II) instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle, wherein the detector is a vehicle detector based on an R-CNN (Region-based Convolutional Neural Network) including:

one or more convolutional layers which generate a feature map for testing from the test image, an RPN (Region Proposal Network) which generates an ROI (Region Of Interest) for testing of the monitored vehicle from the feature map for testing, a pooling layer which generates a feature vector for testing by pooling an area, in the feature map for testing, corresponding to the ROI for testing, at least one FC layer for the vehicle detection which performs at least one fully connected operation on the feature vector for testing, to thereby generate one or more FC output values, a classification layer which outputs the class information for testing on the monitored vehicle by referring to the FC output values, and a regression layer which outputs the location information for testing on the monitored vehicle by referring to the FC output values.

20. The testing device of claim 19, wherein the processor instructs the CNN to receive a concatenated value for testing acquired by using said pieces of cue information for testing on the monitored vehicle generated by the cue information extracting layer and the feature vector for testing generated by the pooling layer of the detector, as an input to the FC layer for monitoring the blind spots.

21. A testing device of a CNN (Convolutional Neural Network) for monitoring one or more blind spots of a monitoring vehicle, comprising:

a communication part for, on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, acquiring class information for testing and location information for testing on the monitored vehicle form the detector which detects the monitored vehicle in a test image taken from the monitoring vehicle; and a processor for (I) instructing the cue information extracting layer to perform the operations by using the class information for testing and the location information for testing on the monitored vehicle, to thereby output one or more pieces of cue information for testing on the monitored vehicle, and (II) instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle, wherein the FC layer for monitoring the blind spots includes a neural network capable of outputting a result value for testing of whether the monitored vehicle is located on one of the blind spots by a multilayer perceptron to which said pieces of cue information for testing or their processed values on the monitored vehicle are inputted.

22. A testing device of a CNN (Convolutional Neural Network) for monitoring one or more blind spots of a monitoring vehicle, comprising:

a communication part for, on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, acquiring class information for testing and location information for testing on the monitored vehicle form the detector which detects the monitored vehicle in a test image taken from the monitoring vehicle; and a processor for (I) instructing the cue information extracting layer to perform the operations by using the class information for testing and the location information for testing on the monitored vehicle, to thereby output one or more pieces of cue information for testing on the monitored vehicle, and (II) instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle, wherein said pieces of cue information for testing on the monitored vehicle include at least part of (i) the class information for testing on the monitored vehicle, (ii) the location information for testing on the monitored vehicle, (iii) size information for testing on the monitored vehicle corresponding to an ROI size, (iv) aspect ratio information for testing on the monitored vehicle, and (v) distance information for testing between a center of the monitored vehicle and one of outer sides of the blind spots.

23. The testing device of claim 22, wherein the cue information extracting layer determines a smaller value among either of (i) a distance of one outer boundary of the blind spot BS-L from the center of the monitored vehicle and (ii) a distance of the other outer boundary of the blind spot BS-R from the center thereof as the distance information for testing between the center of the monitored vehicle and said one of the outer sides of the blind spots, and further outputs relative location information for testing in addition to the distance information for testing in order to determine whether the center of the monitored vehicle is located inside or outside of said one of the outer sides of the blind spots.

24. A testing device of a CNN (Convolutional Neural Network) for monitoring one or more blind spots of a monitoring vehicle, comprising:

a communication part for, on condition that a learning device, (i) has instructed a detector on the monitoring vehicle to output class information for training and location information for training on a monitored vehicle included in a training image corresponding to at least one video image taken from the monitoring vehicle, (ii) has instructed a cue information extracting layer to perform one or more operations by using the class information for training and the location information for training on the monitored vehicle, to thereby output one or more pieces of cue information for training on the monitored vehicle, (iii) has instructed an FC layer (fully connected layer) for monitoring the blind spots to perform one or more neural network operations by using said pieces of cue information for training or their processed values, to thereby output a result for training of determining whether the monitored vehicle is located on one of the blind spots, and (iv) has instructed a first loss layer to generate one or more loss values for the blind spots by referring to the result for training and its corresponding first GT (Ground Truth), to thereby learn one or more parameters of the FC layer for monitoring the blind spots by backpropagating the loss values for the blind spots, and has instructed a second loss layer to generate one or more loss values for vehicle detection by referring to the class information for training and the location information for training and their corresponding second GT, to thereby learn one or more parameters of the detector by backpropagating the loss values for the vehicle detection, acquiring class information for testing and location information for testing on the monitored vehicle form the detector which detects the monitored vehicle in a test image taken from the monitoring vehicle; and a processor for (I) instructing the cue information extracting layer to perform the operations by using the class information for testing and the location information for testing on the monitored vehicle, to thereby output one or more pieces of cue information for testing on the monitored vehicle, and (II) instructing the FC layer for monitoring the blind spots to perform the neural network operations by using said pieces of cue information for testing or their processed values on the monitored vehicle, to thereby output a result for testing of determining whether the monitored vehicle is located on one of the blind spots of the monitoring vehicle, wherein the monitoring vehicle for the testing device is not identical to the monitoring vehicle for the learning device.

* * * * *